United States Patent Office 3,311,565
Patented Mar. 28, 1967

3,311,565
SINGLE SOLUTION DECONTAMINATION
TREATMENT
Norman Michael, Corona del Mar, Calif., assignor to Westinghouse Electric Corporation, Pittsburgh, Pa., a corporation of Pennsylvania
No Drawing. Filed Sept. 21, 1962, Ser. No. 225,354
6 Claims. (Cl. 252—301.1)

The present invention relates to closed cycle nuclear reactors and relates, more particularly, to a novel method for decontaminating such equipment.

In the operation of a nuclear facility, such as a closed cycle reactor power plant which employs a pressurized water reactor, there is a continual build-up of activated corrosion products within the reactor system. Continued build-up of these products presents a serious restriction to the normal operation of the installation. Regular maintenance of the equipment is of outstanding importance where excessive contamination of the system can seriously restrict operation. However, with the advent of economically competitive power from closed cycle nuclear reactors, a change in design philosophy has come about which severely restricts the available means and conditions for plant decontamination. In these newer reactor designs, all superfluous equipment has been eliminated. Gone are such things as isolation valves to enable reactor core bypass and separate loop decontamination. Tankage provided for waste retention has been reduced imposing stringent limitations on the volumes of decontaminating solution and rinse water which may be employed. Nonetheless, when equipment must be serviced and activity is at an intolerable level, a means of decontaminating the reactor system must be provided.

Of the more effective conventional decontaminating procedures, most require two or more chemical treatments with a rinse following each of them. Since the newly designed reactors have only enough waste tankage to accommodate about two system volumes, it has been obvious that a new and simple decontamination method was needed. A secondary, but not inconsequential, factor involved is the cost associated with plant shutdown during cleanup operations. The present invention stems from a consideration of all of these problems and the benefits to be derived from their solution.

It is therefore a primary object of the invention to provide a novel and improved method of decontaminating closed cycle nuclear reactors.

Another object of the invention resides in the provision of a novel single-solution decontamination method.

A further object of the invention resides in the provision of a decontamination method which employs commercially available, low cost chemicals in dilute aqueous media.

Other objects will become apparent from the following detailed description of the invention.

Briefly, it has been discovered that the combination of a complexing agent such as ammonium bifluoride and a corrosion inhibitor such as potassium acid phthalate and various benzoates and salicylates permits decontamination of closed cycle nuclear reactors in a single, simple operation. Concentrations of the chemical agents may be varied to suit particular situations, but quite satisfactory results are obtained without resort to high concentrations. Ordinarily, a concentration in aqueous solution of about 1% of complexing agent and a concentration of about 0.1% to about 5.0% of corrosion inhibitor, will be adequate to obtain virtually complete decontamination of the nuclear equipment treated. In some instances it is desirable to employ a mixture of corrosion inhibitors.

The closed cycle nuclear reactors treated according to the novel method of the invention are commonly equipped with loops constructed of type 304 and 410 stainless steel. The contaminants responsible for the bulk of the activity are, Co–58, Co–60, Mn–54 and Fe–591. The cobalt–58 and Mn–54 activity are induced by n,p and the others primarily by n,γ reactions. These materials form or deposit in radioactive films which are difficult to remove even by the action of strong chemical agents. It is therefore of outstanding importance that the discovery has been made that the novel chemical combination of ammonium bifluoride and one or more corrosion inhibitors serves to substantially completely remove these contaminants in a single treatment while not adversely affecting the base metal.

For convenience in evaluating the effect of the various variables involved in the novel decontamination method, a single measurement is utilized as a figure of merit. This is the decontamination factor (DF). By definition, DF equals net initial activity divided by net final activity. Thus a DF of 100 refers to 99% activity removed while a DF of 5 refers to 80% activity removed. It is understood, of course, that a DF of either 5 or 100 may indicate satisfactory decontamination depending on the initial activity. Corrosion loss is also important as a measure of the degree of attack of the chemicals employed on the base metal of the equipment treated.

In the present invention it has been found that the cleansing solution should be maintained at about 75° F. to about 200° F. depending on the metal being treated. Within this range of temperatures the aqueous solution is flushed through the system for about 30 minutes to about 5 hours until the desired decontamination is obtained. For example, a type 304 stainless steel containing a radioactive oxide coating may be effectively decontaminated in 2.5–3 hours at 170° F. A similar type 410 steel may be decontaminated at 78° F. in about 5 hours in a solution containing 1% ammonium bifluoride and 0.5% potassium acid phthalate. With materials less noble than 304 stainless steel, to minimize base metal corrosion relatively low solution temperatures should be employed. A safe maximum temperature for 410 stainless steel is about 140° F. With 304 stainless steel, base metal attack is relatively negligible at temperatures of 200° F. or even higher.

Specimens of 304 and 410 stainless steel which had received 400 hours exposure in an in-pile test loop, containing boric acid solution (8,900 p.p.m. $H_3BO_3$) at 550° F., were treated with a solution containing 1% ammonium bifluoride and 0.5% potassium acid phthalate to remove radioactive contamination. With the 304 stainless steel, exposure for three hours to 170° F. solution reduced the residual activity to only 5% of the initial activity (DF20). With the 410 stainless steel, a five hour exposure at room temperature left a residual activity of 7.6% of the initial activity (DF13+), and an additional three hours at 170° F. left only 0.2% of the starting activity (DF500).

The following two tables present data relative to both types of stainless steel at a temperature of 140° F.

TABLE I.—DECONTAMINATION OF 304 STAINLESS STEEL AFTER 400 HOURS EXPOSURE IN AQUEOUS SOLUTION* AT 550° F. IN IN-PILE TEST LOOP

| Decontaminating Conditions | | | Relative γ Peak Heights (Percent) | | | Wt. Loss (mg./dm.²) |
|---|---|---|---|---|---|---|
| Solution (Concentration) | Avg. Temp. (° F.) | Time (Min.) | $Co^{58}$ | $Co^{60}$ | Total Photons | |
| 1.0% ABF + 0.5% KAP | | 0 | 100 | 100 | 100 | |
| 1.0% ABF + 0.5% KAP | 140 | 30 | 98.2 | 96 | 95.6 | 20.3 |
| 1.0% ABF + 0.5% KAP | 140 | 60 | 96.5 | 90 | 89.6 | 0 |
| 1.0% ABF + 0.5% KAP | 140 | 90 | 62.1 | 58.2 | 59.4 | 17.4 |
| 1.0% ABF + 0.5% KAP | 140 | 120 | 11.1 | 10.4 | 9.4 | 5.8 |
| 1.0% ABF + 0.5% KAP | 140 | 150 | 5.4 | 5.2 | 4.5 | 2.9 |

*Solution contained 1,550 p.p.m. boron, <0.1 p.p.m. Cl⁻, and <0.1 p.p.m. $O_2$.

NOTE.—Relative γ Peak Heights for both cobalt isotopes are the mean value of the two major γ peaks. ABF is ammonium bifluoride. KAP is potassium acid phthalate. Dm.² represents square decimeters.

TABLE II.—DECONTAMINATION OF 403 STAINLESS STEEL AFTER 400 HOURS EXPOSURE IN AQUEOUS SOLUTION* AT 550° F. IN IN-PILE TEST LOOP

| Decontaminating Conditions | | | Relative γ Peak Heights (Percent) | | | Wt. Loss (mg./dm.²) |
|---|---|---|---|---|---|---|
| Solution (Concentration) | Avg. Temp. (° F.) | Time (Min.) | $Co^{58}$ | $Co^{60}$ | Total Photons | |
| 1.0% ABF + 0.5% KAP | | 0 | 100 | 100 | 100 | |
| 1.0% ABF + 0.5% KAP | 140 | 30 | 5.3 | 5.0 | 5.1 | 109.1 |
| 1.0% ABF + 0.5% KAP | 140 | 60 | 2.8 | 3.0 | 2.8 | 64.6 |
| 1.0% ABF + 0.5% KAP | 140 | 90 | 2.3 | 2.5 | 2.3 | 77.2 |

*Solution contained 1,550 p.p.m. boron, <0.1 p.p.m. Cl⁻, and <0.1 p.p.m. $O_2$.

NOTE.—Relative γ Peak Heights for both cobalt isotopes are the mean value of the two major γ peaks.

Table III presents corrosion data on 304 stainless steel with varying concentrations of potassium acid phthalate over a varying temperature range.

TABLE III.—RATE OF CORROSION OF 304 STAINLESS STEEL (ABRADED WITH #400 EMERY PAPER) IN 1% AMMONIUM BIFLUORIDE AND POTASSIUM ACID PHTHALATE

| KAP Concentration (Percent) | Average Temperature | | Corrosion Rate (mg./dm.²/hr.) |
|---|---|---|---|
| | ° F. | ° C. | |
| 0 | 74.3 | 23.5 | 2.6 |
| | 110.3 | 43.5 | 9.3 |
| | 134.6 | 57.0 | 16.3 |
| | 164.3 | 73.5 | 23.8 |
| 0.1 | 77.0 | 25.0 | 3.1 |
| | 109.4 | 43.0 | 8.7 |
| | 133.7 | 56.5 | 14.1 |
| | 167.0 | 75.0 | 20.7 |
| 0.5 | 77.0 | 25.0 | 2.6 |
| | 109.4 | 43.0 | 6.7 |
| | 133.7 | 56.5 | 12.9 |
| | 167.9 | 75.5 | 16.5 |
| 2.0 | 78.8 | 26.0 | 2.1 |
| | 109.4 | 43.0 | 5.6 |
| | 134.6 | 57.0 | 10.3 |
| | 164.8 | 73.8 | 13.3 |
| 5.0 | 78.8 | 26.0 | 1.0 |
| | 109.4 | 43.0 | 3.1 |
| | 134.6 | 57.0 | 6.7 |
| | 167.0 | 75.0 | 10.3 |

From the foregoing data it will be apparent that the single solution of the present invention permits almost total decontamination without appreciable corrosion of the base metal employed. In addition to potassium acid phthalate, other suitable corrosion inhibitors include ammonium benzoate, ammonium salicylate, sodium benzoate, and sodium salicylate. For example, very satisfactory decontamination was obtained with these carboxylate inhibitors and ammonium bifluoride under essentially the same conditions recited hereinbefore. Corrosion rates of these solutions are given in the following table.

TABLE IV.—THE EFFECT OF CARBOXYLATE INHIBITORS ON THE CORROSION OF 410 STAINLESS STEEL (ABRADED WITH #400 EMERY PAPER) IN 1% AMMONIUM BIFLUORIDE

| Inhibitor Conc. (Percent) | Potassium Acid Phthalate | | Ammonium Benzoate | | Ammonium Salicylate | | Sodium Benzoate | | Sodium Salicylate | |
|---|---|---|---|---|---|---|---|---|---|---|
| | Temp. (° C.) | Wt. Loss (mg./dm.²/hr.) | Temp. (° C.) | Wt. Loss (mg./dm.²/hr.) | Temp. (° C.) | Wt. Loss (mg./dm.²/hr.) | Temp. (° C.) | Wt. Loss (mg./dm.²/hr.) | Temp. (° C.) | Wt. Loss (mg./dm.²/hr.) |
| 0.1 | 17.4 | 20.9 | 25.5 | 23.5 | 27.4 | 18.6 | N.R. | | N.R. | |
| 0.1 | 42.3 | 66.0 | 43.0 | 53.5 | 43.0 | 34.8 | N.R. | | N.R. | |
| 0.1 | 59.3 | 200.4 | 56.0 | 182.4 | 56.5 | 107.4 | N.R. | | N.R. | |
| 0.1 | 76.0 | 619.5 | 70.0 | 430.4 | 74.4 | 429.6 | N.R. | | N.R. | |
| 0.5 | 16.7 | 13.1 | 26.3 | *18.6 | 27.5 | 14.7 | N.R. | | N.R. | |
| 0.5 | 42.8 | 50.4 | 43.3 | 37.9 | 43.0 | 22.3 | N.R. | | N.R. | |
| 0.5 | 59.5 | 134.4 | 56.0 | 124.8 | 56.5 | 75.5 | 55.5 | 68.3 | 56.0 | 62.8 |
| 0.5 | 76.0 | 396.8 | 74.0 | 269.4 | 74.3 | 243.3 | 72.5 | 283.3 | 75.5 | 294.9 |
| 2.0 | 19.5 | 12.8 | — | — | 27.3 | *17.3 | N.R. | | N.R. | |
| 2.0 | 42.0 | 44.3 | — | — | 43.0 | 19.1 | N.R. | | N.R. | |
| 2.0 | 59.0 | 96.3 | 56.5 | *57.0 | 56.5 | 55.1 | 57.0 | *37.7 | 56.5 | 36.8 |
| 2.0 | 77.0 | 334.4 | 74.3 | 88.4 | 74.8 | 165.3 | 73.5 | 84.5 | 74.8 | 164.4 |
| 5.0 | 18.5 | 10.4 | — | — | — | — | N.R. | | N.R. | |
| 5.0 | 43.0 | 33.6 | — | — | — | — | N.R. | | N.R. | |
| 5.0 | 59.5 | 80.1 | 57.0 | *27.5 | 57.0 | 54.7 | N.R. | | N.R. | |
| 5.0 | 76.5 | 168.5 | 75.0 | 53.9 | 74.5 | 108.5 | N.R. | | N.R. | |

*Incomplete solubility at these test temperatures and concentrations; some white precipitate present.
—=Only slight solubility under these conditions: no test was performed.
N.R.=Not run.

The effects of employing a mixture of corrosion inhibitors is illustrated by the data set forth in the following tables. Also included in Table VI are data relative to the employment of ammonium dihydrogen phosphate. It was discovered, and it is an important feature of the invention, that this phosphate prevents the formation of a thin smut layer on the metal subsequent to the decontamination treatment. Thus, where this prevention is desirable, the presence of the phosphate in the treating solution becomes a requisite element of the decontamination treatment. As illustrated in the table, amounts of phosphate within the concentration range of about 0.5% to about 4% may be satisfactorily employed.

TABLE V.—CORROSION OF ABRADED 304 AND 410 SS MATERIAL IN 1.0% ABF AT 142° F. WITH VARIOUS CONCENTRATIONS OF KAP AND AMMONIUM PHOSPHATE, MONOBASIC

| Specimen Material (Abraded) | 1.0 w/o ABF Solution | | Weight loss ª | | |
|---|---|---|---|---|---|
| | Conc. KAP (percent) | Concentration Amm. phosphate (percent) | Mg. | Mg./dm.²/hr. | |
| 304 A-1 | 0 | 4.0 | 0.2 | 2.1 | 2.1 |
| B-1 | 1.0 | 3.0 | 0.2 | 2.1 | 2.1 |
| C-1 | 2.0 | 2.0 | 0.2 | 2.1 | 2.1 |
| D-1 | 3.0 | 1.0 | 0.2 | 2.1 | 2.1 |
| E-1 | 4.0 | 0 | 0.8 | 8.4 | 8.4 |
| 410 A-2 | 0 | 4.0 | 2.3 | 17.6 | 17.6 |
| B-2 | 1.0 | 3.0 | 2.3 | 17.8 | 18.6 |
| C-2 | 2.0 | 2.0 | 2.4 | 18.6 | 19.4 |
| D-2 | 3.0 | 1.0 | 4.0 | 31.0 | 31.8 |
| E-2 | 4.0 | 0 | 12.8 | 96.2 | 98.5 |

ª After scrubbing.

TABLE VI.—CORROSION OF ABRADED* SS MATERIAL AT 142° F. IN 1.0% ABF+0.5% KAP WITH VARIOUS ADDED CONCENTRATIONS OF AMMONIUM DIHYDROGEN PHOSPHATE

| Specimen Material | Specimen Number | Conc. of Amm. Dihydrogen Phosphate (Percent) | Immersion Time (Hours) | Accumulative Weight Loss | |
|---|---|---|---|---|---|
| | | | | Mg. | Mg./dm.² |
| 410 SS | A-1 | 0.5 | 2 | 18.4 | 142.6 |
| | | | 4 | 37.8 | 293.0 |
| | | | 6 | 58.7 | 455.0 |
| | B-1 | 1.0 | 2 | 8.4 | 65.1 |
| | | | 4 | 16.0 | 124.0 |
| | | | 6 | 24.5 | 189.9 |
| | C-1 | 2.0 | 2 | 5.6 | 43.4 |
| | | | 4 | 10.1 | 78.3 |
| | | | 6 | 15.0 | 116.3 |
| | D-1 | 3.0 | 2 | 4.9 | 38.0 |
| | | | 4 | 7.7 | 59.7 |
| | | | 6 | 11.7 | 90.7 |
| | E-1 | 4.0 | 2 | 4.0 | 32.0 |
| | | | 4 | 6.6 | 52.8 |
| | | | 6 | 9.5 | 76.0 |
| 304 SS | A-2 | 0.5 | 2 | 1.0 | 10.0 |
| | | | 4 | 1.7 | 17.0 |
| | | | 6 | 2.3 | 23.1 |
| | B-2 | 1.0 | 2 | 0.8 | 8.3 |
| | | | 4 | 1.3 | 13.4 |
| | | | 6 | 1.6 | 16.5 |
| | C-2 | 2.0 | 2 | 0.6 | 6.2 |
| | | | 4 | 0.9 | 9.3 |
| | | | 6 | 1.0 | 10.3 |
| | D-2 | 3.0 | 2 | 0.5 | 5.2 |
| | | | 4 | 0.6 | 6.2 |
| | | | 6 | 0.7 | 7.2 |
| | E-2 | 4.0 | 2 | 0.4 | 4.1 |
| | | | 4 | 0.4 | 4.1 |
| | | | 6 | 0.4 | 4.1 |

*Material abraded with 400 emery paper.

The single solution decontamination treatment of the invention is also applicable to various other metals as evidenced by the data given in the following table.

TABLE VII.—CORROSION RESISTANCE OF VARIOUS MATERIALS IN 1.0% ABF+0.5% KAP+2.0% AMMONIUM DIHYDROGEN PHOSPHATE AT 142° F.

| Material | Weight Loss | | Penetration (mils/hr.) |
|---|---|---|---|
| | Mg. | Mg./dm.²/hr. | |
| Haynes-25 | 0 | 0 | |
| Monel | 0 | 0 | |
| 316 SS | 0.3 | 2.4 | $1.18 \times 10^{-3}$ |
| Stellite-6 | 0.4 | 4.4 | $2.07 \times 10^{-3}$ |
| 304 SS | 0.5 | 5.1 | $2.53 \times 10^{-3}$ |
| Inconel | 2.9 | 11.5 | $5.32 \times 10^{-3}$ |
| Nicrobraze-50 | 3.2 | 12.7 | $6.43 \times 10^{-3}$ |
| 304 SS (sensitized) | 0.7 | 12.9 | $6.40 \times 10^{-3}$ |
| 410 SS | 2.8 | 22.4 | $1.14 \times 10^{-2}$ |
| 403 SS | 2.4 | 23.5 | $1.19 \times 10^{-2}$ |
| Graphitar-14 | 7.5 | 29.8 | $6.41 \times 10^{-2}$ |

All materials abraded with 400 emery paper prior to testing.

From the foregoing description and test data it will be appreciated that the present invention provides a simple one-step decontamination treatment for nuclear reactors. The novel method permits quick decontamination of such power equipment resulting in outstanding reduction of shutdown time. The invention therefore represents a decided advance in the art with attendant economic benefits.

I claim as my invention:

1. A method of decontaminating a metal surface coated with a radioactive scale which comprises flushing said surface continuously with a dilute aqueous solution consisting of ammonium bifluoride in a concentration of about 1% and a corrosion inhibitor selected from the group consisting of potassium acid phthalate, ammonium benzoate, ammonium salicylate, sodium benzoate, and sodium salicylate, said inhibitor being present in a concentration of about 0.5% to about 5%.

2. A method as in claim 1 and wherein the aqueous solution is maintained at a temperature of about 75° F. to about 200° F.

3. A method as in claim 2 and wherein the flushing treatment is carried out for a period of time of about 30 minutes to about 5 hours.

4. A method of decontaminating a metal surface coated with a radioactive scale which comprises flushing said surface continuously with a dilute aqueous solution consisting of ammonium bifluoride in an amount of about 1%, ammonium dihydrogen phosphate in an amount of about 0.5% to about 4%, and a corrosion inhibitor selected from the group consisting of potassium acid phthalate, ammonium benzoate, ammonium salicylate, sodium benzoate, and sodium salicylate, said inhibitor being present in an amount of about 5%.

5. A method as in claim 4 and wherein the aqueous solution is maintained at a temperature of about 75° F. to about 200° F.

6. A method as in claim 5 and wherein the flushing treatment is carried out for a period of time of about 30 minutes to about 5 hours.

References Cited by the Examiner

UNITED STATES PATENTS

| 2,316,220 | 4/1943 | Brown et al. | 252—136 |
| 2,629,693 | 2/1953 | Barton et al. | 252—396 X |
| 3,033,795 | 5/1962 | Brevik | 252—79.3 X |

FOREIGN PATENTS

| 838,258 | 1/1959 | Great Britain. |

LEON D. ROSDOL, *Primary Examiner.*

JULIUS GREENWALD, *Examiner.*

W. E. SCHULZ, *Assistant Examiner.*